Sept. 14, 1954　　　G. W. JANDACEK　　　2,688,771
LIQUID FEEDING AND DISTRIBUTING DEVICE
Filed March 7, 1951
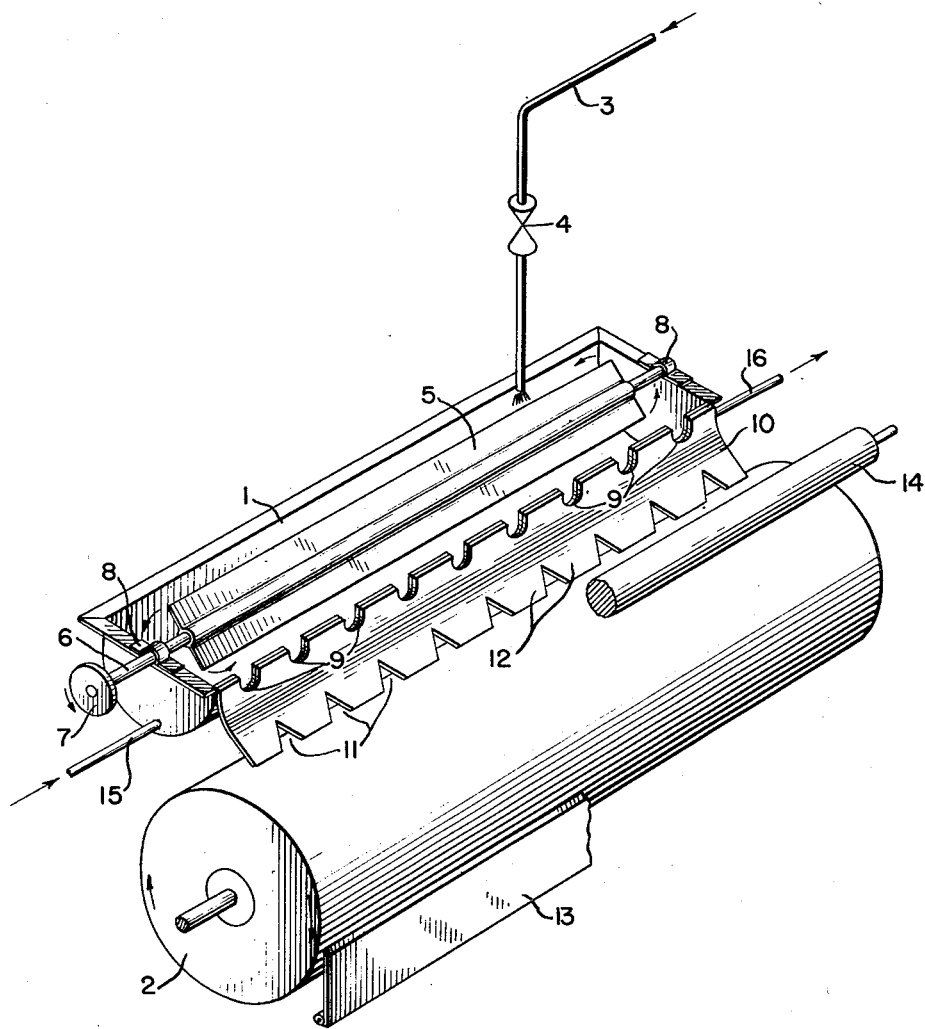
INVENTOR:
GEORGE W. JANDACEK
BY:
Chester J. Giuliani
Philip F. Leggett
ATTORNEYS:

Patented Sept. 14, 1954

2,688,771

UNITED STATES PATENT OFFICE 2,688,771

LIQUID FEEDING AND DISTRIBUTING DEVICE

George W. Jandacek, Chicago, Ill., assignor to Universal Oil Products Company, Chicago, Ill., a corporation of Delaware Application March 7, 1951, Serial No. 214,396

2 Claims. (Cl. 18—15)

1

This invention relates to an improved type of liquid feeding and distributing device, and more particularly to an improved form of feeding trough or pan for effecting the distribution of viscous, or heterogeneous fluid mixtures to the surface of a drum or roller in a uniform manner and with a minimum of phase separation.

In the usual flaking operation, the flaker drum or roller dips into a shallow pan maintaining the liquid therein, or a pan or tray holds the liquid against the side of the roller in order that a layer thereof is formed on the drum, and a knife or blade is held against the drum at another point in order to remove the product from the surface thereof in flaked solid form. The drum is also usually internally cooled in order that the liquid material is caused to more rapidly crystallize or solidify on the surface of the drum prior to being scraped off by the knife or scraper blade. In some instances, the liquid medium is supplied intermediately between two adjacent rollers which are revolved in opposite direction, thus the liquid medium is held in a trough-like recess between the two drums and at the same time liquid is applied to each of the two drums. The usual liquid feeding and distributing trays or troughs do not provide means for maintaining a heterogeneous fluid mixture in an agitated state and do not provide for the uniform transfer of the liquid to the surface of the drum so that a substantially uniform layer of the material is applied to the drum with little or no phase separation of the liquid components.

It is a principal object of the present invention to provide a liquid feeding trough having mechanical mixing means in combination therewith so that a heterogeneous liquid mixture having a tendency to rapidly separate may be fed uniformly to the surface of a roller, such as a flaking roller.

It is a further object of the present invention to utilize in combination with the liquid feed trough a specially constructed and arranged notched or serrated distributing member that effects the transfer of a liquid mixture uniformly to the surface of a rotating drum or roller.

Briefly the improved apparatus of this invention for distributing a heterogeneous liquid mixture over the surface of the roller, comprises in combination, a horizontally positioned and elongated trough having spaced notches along the upper edge of one side and providing a plurality of spaced liquid outlets from the upper portion of the trough, fluid inlet means communicating with the trough, a rotatable mixing paddle extending longitudinally within the trough and driving means connecting therewith for rotating the paddle and maintaining the liquid mixture therein in an agitated state, and a notched distributing member extending along and downwardly from the notched side of the trough whereby to receive the liquid being discharged from the notches of the trough and with the distributing member having a serrated lower edge adapted to contact the roller and uniformly distribute the fluid mixture to the surface of the roller with a minimum of phase separation.

In a preferred embodiment of the liquid distributing apparatus, the trough has a rounded bottom, and is substantially semi-cylindrical in form. The longitudinal mixing means extending throughout the length of the tank may comprise one or more blades attached to a rotating shaft such that the liquid mixture maintained in the trough is constantly agitated and maintained in a heterogeneous mixture without phase separation. The rotating paddle means and mixing means is also operated in a manner to rotate the liquid toward the longitudinal side of the trough which is notched, thus, with the fluid inlet means maintaining a continuous flow to the trough and a substantially constant liquid level within the trough, the fluid material or mixture flows outwardly through the notched portions of the trough side and on to the distributing member which in turn contacts or comes adjacent the roller or drum onto which the liquid medium is being distributed.

It is also a feature of the present invention to have a special form of distributing member extending from the trough to the drum or roller. A plurality of spaced notches or serrations are provided along the lower edge of the distributing member, and these notches in turn effect an evening out of the fluid mixture to provide a substantially uniform distribution of the material onto the surface of the roller. The serrated edge of the distributing member, which comes in contact with the drum or roller also provides in effect a combing action, and for a relatively viscous liquid, this type of action is desirable in effecting a uniform distribution of the material longitudinally across the roller. In some instances, it may be desirable to provide in combination with the distributing device and the main roller or drum, a small diameter conditioning roller which is closely adjacent to the flaker roller, but provides a predetermined thickness to the material deposited on the surface of the flaker roller. Such a conditioning roller is preferably placed closely adjacent to the edge of the serrated distributing member so that the thickness of the liquid film or layer on the drum or flaking roller is provided immediately after the distribution and deposition of the liquid medium on to the surface of the main roller.

The present invention also provides means for utilizing a heating coil in the lower portion of the trough, or alternatively, a heating jacket may be utilized longitudinally along and around the lower portion of the liquid trough in order that the liquid material therein is maintained in a heated state where such is desirable to aid in the prevention of phase separation, or in a too rapid solidification of the liquid medium.

The accompanying drawing shows diagrammatically one embodiment of the improved liquid feed and distributing device of this invention and reference to the drawing and the following description thereof will serve to further clarify the operation and advantageous features in connection therewith.

Referring now to the drawing, there is indicated a longitudinal trough 1, which in this instance has an open top and is adapted to be positioned horizontally adjacent a horizontally extending drum or roller 2. The trough is indicated in this arrangement, as being somewhat above the roller 2 in a manner having a liquid medium distributed to the upper portion of the roller, however, the trough may extend alongside of the roller such that the liquid medium is distributed to the rising surface of the roller 2 as it rotates continuously by means of suitable power driven means connecting with the shaft thereof, and not shown in the present drawing. The liquid medium or mixture which is to be applied to the surface of the roller for crystallization or solidification and removal therefrom in a substantially solid form, is continuously introduced into the interior of trough 1 by means of line 3 and control valve 4. The present improved form of liquid distributing trough is of course not limited to use with any one material or mixture, although while it may be utilized in flaking operations for those chemical products which have a definite, but not too low a melting point, including salts which melt and dissolve completely in their water of crystallization such as caustic soda, caustic potash, sulfur, calcium chloride, magnesium chloride, tri-sodium phosphate, etc., it is particularly useful for liquid mediums comprising heterogeneous mixtures that are difficult to prevent from rapidly separating. For example, a flaked solid antioxidant material is prepared from a heterogeneous liquid mixture of utylated hydroxyanisole, citric acid and propyl gallate. In this particular mixture the citric acid tends to rapidly settle and will not readily stay in admixture with the other liquid mediums to provide a proper mixture for attaining uniform distribution to the flaker roller.

As indicated in the drawing, the trough 1 also preferably has a rounded bottom, being substantially semi-cylindrical in form, so that a heterogeneous mixture, as just described, may be kept in agitation by a rotating mixing blade or paddle such as the longitudinal blade 5 attached to longitudinal shaft 6 and rotated by suitable motor driven means connecting with a gear or a pulley wheel 7, such as indicated connecting with the end of the shaft 6. Suitable bearings 8 may be provided at each end of the trough 1 in order to hold the rotating shaft 6 in proper alignment.

In the present embodiment, the paddle blade 5 is rotated in a counter-clockwise direction so that the liquid mixture is not only agitated by the paddle but is moved towards the outlet side of the trough 1 having the plurality of notches 9.

A plurality of notches 9 are provided not only on the upper edge of the side of the trough 1 but in the upper edge of a connecting and distributing plate 10 so that the liquid mixture from within the trough 1 may be continuously discharged through each notch onto the upper surface of plate 10 and from the latter onto the roller 2. The longitudinal distributing member 10 may however be attached to the trough in a manner so that the upper edge is just below the plurality of notches 9 in the edge of the trough 1, so that the liquid medium passes directly from the notches in the side of the trough onto the upper surface of the plate 10.

In accordance with a preferred and improved construction of the present distributing apparatus, the fluid distributing member 10 has its lower edge provided with a plurality of spaced notches or serrations 11 so that the liquid material pouring downwardly over the upper surface of plate 10 is in turn distributed from a plurality of tips or tooth-like portions 12 formed between each of the notches 11. The serrated or toothed edge, formed by the plurality of notches 11, it has been found effects a more even distribution of the liquid mixture passing downwardly to the surface of roller 2. With an unbroken distributing edge, there is a tendency for any liquid medium, particularly a viscous medium, to be piled up or retarded in its flow along one or more portions of the edge, while one or more other portions thereof tend to effect the entire distribution of the material. On the other hand, with the serrated edge construction and the plurality of tooth-like portions 12, the liquid is in turn distributed to the surface of roller 2 at a plurality of spaced points and allowed to spread laterally after reaching the surface of the roller itself and provide a resulting more uniform thickness to the liquid medium forming the film or layer on the roller which is eventually crystallized or solidified and scraped therefrom.

In the present embodiment, the roller 2 turns clockwise, or downwardly and away from the lower edge of the liquid distributing member 10 and as the liquid mixture cools and crystallizes on the surface of roller 2, it is in a form which a suitable longitudinal scraper blade, such as 13, having an upper cutting edge in contact with the surface of roller 2 may effect the cutting off and flaking of the solid material. A suitable collecting trough and conveyor may be provided longitudinally along the lower edge of the drum 2 and under the cutting blade 13 so that the flakes or solids material may be continuously carried away from the flaking roller, however, such conveying means is not indicated in the present drawing.

Auxiliary processing means may also be used in connection with the flaking roller 2, such as for example means may be provided for introducing a cooling medium into the interior of roller 2 so that a temperature much lower than that of the atmospheric temperature may be effected at the surface of roller 2 to aid in the solidification or crystallization of the liquid mixture applied thereto. Also, a suitable thickness governing roller or conditioning roller 14 may be maintained a predetermined spaced distance away from the surface of roller 2 and just beyond the lower edge of distributing member 10 such that the liquid film or layer being applied to the surface of the roller may be rolled to a substantially uniform thickness prior to its solidification and scraping off.

The liquid distributing apparatus of the present invention preferably has temperature controlling means in connection therewith so that the liquid medium or mixture being introduced into the rough may be controlled to maintain a suitable temperature and physical characteristics prior to distribution directly on to the surface of roller 2. The present embodiment indicates an inlet 15 at the lower end of the trough 1 in order that a heating medium connect with a suitable heating coil or the like, not shown in the drawing, within the lower interior portion of the trough 1 and in indirect heat exchange with the liquid medium in trough 1. A suitable liquid outlet 16 is indicated at the other end of trough 1 to discharge the heating medium being passed through inlet 15 and the heating coil within the trough. In an alternative type of construction, a jacket may be provided longitudinally around the trough 1 in order to accommodate a heating medium within a space between the outside of trough 1 and the jacketing member.

It should be noted that the apparatus of this invention need not be limited to the use of but one blade, such as paddle 5, for the mixing means extending longitudinally within the trough 1. However, the mixing blades utilized should be of the type providing agitation in the body of liquid maintained in the trough, without excessive splashing from an open type of trough, or effect a substantially agitated and uneven surface to the liquid medium, so that there is a resulting nonuniform distribution of the liquid medium through the plurality of notches 9. The notches 9 in the upper edge of the side of the trough 1 are indicated in the present drawing as having half-round shape, however, they may be of another form, such as of a V shape or trapezoidal shape, to provide a plurality of points of liquid distribution, and particularly to provide substantially uniform distribution throughout the full length of the trough 1.

It may also be noted, that while an overhead distributing line 3 is indicated for introducing a fluid medium or liquid mixture into the trough 1, that a suitable inlet line may connect directly with a side of tank 1 and pumping means provided in the charge line for continuously introducing a fluid medium into the trough for continuous distribution from the side thereof on to the distributing member 10 and to the surface of a suitable roller 2.

I claim as my invention:

1. Apparatus of the class described which comprises in combination, an elongated horizontally positioned trough having a plurality of spaced notches along the upper edge of one longitudinal side, fluid inlet means communicating with said trough, rotatable mixing paddle means extending longitudinally within said trough and driving means connecting therewith for rotating said paddle means, a liquid receiving roller, a distributing member extending along and downwardly from said notched side of the trough to said roller, said distributing member having a serrated lower edge in contact with the liquid receiving roller to uniformly distribute said liquid from said trough to the surface of said roller.

2. Apparatus of the class described comprising in combination, a horizontally positioned elongated trough having a substantially semi-cylindrical bottom portion and a longitudinal side wall provided with a plurality of spaced notches along its upper edge, a rotatable mixing paddle extending longitudinally within said trough, means connecting with said paddle for rotating the latter within said trough and agitating liquid therein, fluid inlet means communicating with said trough, a liquid receiving roller, a fluid distributing member extending along and downwardly from the notched side of said trough to said roller, said member having notches in its upper portion adjacent to and matching the notches in the upper edge of said side wall of said trough, said distributing member having serrations along the lower edge thereof forming a plurality of toothed portions in contact with said roller to uniformly distribute liquid from said trough to the surface of the roller.

References Cited in the file of this patent

UNITED STATES PATENTS

| Number | Name | Date |
| --- | --- | --- |
| 318,374 | Irwin | May 19, 1885 |
| 815,763 | Tittle | Mar. 20, 1906 |
| 900,787 | Schreck | Oct. 13, 1908 |
| 1,445,004 | Cowles | Feb. 13, 1923 |
| 1,957,594 | Helm | May 8, 1934 |
| 2,488,876 | Newhall | Nov. 22, 1949 |